United States Patent [19]

Yamamoto

[11] 3,818,129

[45] June 18, 1974

[54] LASER IMAGING DEVICE

[75] Inventor: Manabu Yamamoto, Odawara, Japan

[73] Assignee: Hitachi, Ltd., Tokyo, Japan

[22] Filed: June 27, 1972

[21] Appl. No.: 266,636

[30] Foreign Application Priority Data

| | | |
|---|---|---|
| June 30, 1971 | Japan | 46-47214 |
| Mar. 17, 1972 | Japan | 47-26566 |
| Mar. 17, 1972 | Japan | 47-26567 |

[52] U.S. Cl. .......... 178/7.3 D

[51] Int. Cl. .......... H04n 5/66

[58] Field of Search .......... 178/7.3 D, 6.8, 7.5 R; 250/199

[56] References Cited

UNITED STATES PATENTS

| | | | |
|---|---|---|---|
| 3,507,984 | 4/1970 | Stavis | 178/5.4 ES |
| 3,539,245 | 11/1970 | Brienza | 250/199 |
| 3,637,929 | 1/1972 | Kaminow | 178/7.3 D |
| 3,691,482 | 9/1972 | Pinnow | 250/199 |

*Primary Examiner*—Richard Murray
*Attorney, Agent, or Firm*—Thomas E. Beall, Jr.

[57] ABSTRACT

This invention relates to the imaging device in which a spatial picture corresponding to an original picture is reproduced from a time-sequence video-signal corresponding to said original picture. Said device comprises means with which an acoustic wave propagated through an acousto-optic medium such as the transparent saphire crystal is modulated by said time-sequence video-signal, thereby to convert a time-sequence distribution of said signal into a spatial distribution of an optical property of said medium, and means which irradiates pulse laser light beam and which emits said light beam in a manner to be synchronized in time with said video-signals. If the laser light beams of different colors is used in this device, the multi-color imaging device is obtained.

16 Claims, 10 Drawing Figures

LASER IMAGING DEVICE

BACKGROUND OF THE INVENTION

1. Field of the Invention

The present invention relates to an imaging device in which, as in television and facsimile receivers, time-sequence video-signals obtained by sequentially scanning the spatial distribution of an original picture are received to reproduce the original picture from the video-signals. More particularly, it relates to an imaging device which reproduces the original picture from such time-sequence video-signals by utilizing the acousto-optic light modulation technique.

2. Description of the Prior Art

The imaging device of this type being the commonest today is one which employs a cathode ray tube television receiver. The cathode ray tube, however, is unsuitable to a large screen display on account of restrictions in the manufacturing technique thereof. Moreover, with color picture tubes presently used, the perfect coincidence of dots of the three primary colors can neither be attained, nor a high resolution can be expected.

In order to obtain larger screens than in the cathode ray tube television receiver, there are a method in which the screen of a liquid-cooled high-brightness cathode ray tube is enlarged and projected by an optical system, or a method in which a deformable oil film or plastic film is scanned by cathode rays and in which an uneven pattern appearing at the surface of the film and corresponding to an original picture is projected by a Schlieren optical system. Any methods, however, have problems in, e.g., the quality of a reproduced picture and the life time of components therefor, and are not yet attained to extensive practical uses.

On the other hand, a laser television display device using a laser beam has been recently developed. Detailed discussions on the device are made in, for example, "Laser Display," C. E. Baker, U.S. Pat. No. 3,549,800; "Large Screen Laser Color TV Projector," Y. Yamada, M. Yamamoto and S. Nomura, International Quantum Electronics Conference, Kyoto, 1970; "Ōyō Butsuri (Applied Physics)," (Japanese institutional bulletin), Vol. 39, No. 5, page 485 (published 1970); and "Denshi Gijutsu (Electronic Engineering)," (Japanese technical journal), Vol. 13, No. 2, pp. 148 – 151 (published 1971).

Since the system projects a picture in such way that a laser beam is intensity-modulated by television video-signals and that the modulated beam is further swept by a light-beam deflector, it has the possibility of accomplishing an image of high resolution and high picture quality owing to the sharp directiveity and monochromaticity of the laser beam. Under the present situations, however, there are still some points requiring technical improvements. More specifically, first of all, the system necessitates a stable, continuous-wave, tricolor laser light source having a high power light output. At present, all the conditions are satisfied by only the argon ion laser and the krypton ion laser. Since, however, these kinds of laser are low in the conversion efficiency, the power dissipation of the device becomes excessive to the disadvantage. The second problem is concerned with light controls such as light modulation and light deflection. For example, in a light modulator utilizing the electro-optic effect in which the optical property of a medium is changed by applying an electric field to the medium, a precise temperature control of the electro-optic crystal is often required. Moreover, in order to reproduce a picture of high resolution, a wide-band and high-output video-amplifier is required as a driving power source for the modulator. Further, mechanical light deflectors (rotating mirror, vibrating mirror, etc.,) generally used at present are slow in the deflecting speed, which leads to a technical difficulty in such case where the number of scanning lines is increased in order to make the device highly resoluble.

In addition to the above electro-optic effect, there can be utilized as the light controlling method the acousto-optic effect in which light is refracted, diffracted or scattered by the interaction between acoustic waves or other elastic waves propagated through a medium and light waves. An example is discussed in a paper by A. Korpel et al., contained in "Applied Optics," Vol. 5, No. 10 (1966), on and below page 1667. The paper discloses a television display system employing an acousto-optic device. The system adopts a method in which a continuous-wave laser beam is modulated and deflected in time sequence by the acousto-optic device. It is disadvantageous, however, in that, since the deflection angle of the laser beam is small and the response of the device is relatively slow to modulation signals, a high resolution is hardly attainable. It is a difficulty in the practical use that a high-speed rotating mirror for line scanning is necessitated in the system to obtain high resolution.

A system disclosed in Leo Levi's paper contained in "Electronics, Engineering Edition," Vol. 31 (Aug. 1, 1958), on and below page 80, uses an incoherent light source. It is therefore disadvantageous in that a high coefficient of light transmission as in the case of employing a laser beam with sharp directivity is difficult to obtain. The paper refers also to a short exposure method. Since, however, the illuminating duration of light produced by incoherent flash lamps is relatively long and usually exceeds 1 microsecond, video-signals corresponding to a number of picture elements are included within the illuminating duration as will be understood from a discussion on the duration of a light source hereinafter made. Accordingly, the imaging using the incoherent flash lamp does not differ in principle at all from the foregoing system using the light source of continuous operation, and also has the disadvantage of requiring the high-speed scanning means.

To sum up, the prior-art laser imaging devices adopt the system in which the continuous-wave laser beam is sequentially modulated and deflected by the time-sequence video-signal, and simultaneously the laser beam is swept. A stable laser light source of continuous operation and a light deflector of high deflecting speed are therefore indispensable as constituents of the prior-art devices.

SUMMARY OF THE INVENTION

It is accordingly the first object of the present invention to provide a laser imaging device of simple construction, which enables reproduction of pictures of a quality equal to or higher than that of the prior-art standard television broadcast.

The second object of the present invention is to provide a laser imaging decice with which a continuous-wave laser light source and a high-speed light deflector as in the prior-art devices of the same type are dispensed with.

The third object of the present invention is to provide a laser imaging device which utilizes a pulse-operation laser light source, an acousto-optic light modulating means and a low-speed light deflector.

The fourth object of the present invention is to provide a laser imaging device which is capable of larger screen display than with a cathode ray tube.

The fifth object of the present invention is to provide a laser imaging device suitable to reproduction of high quality pictures, in which the highest level of brightness is uniform over the entire area of a screen, and besides, it is not feared for any light leakage to occur at a part of the lowest (dark) level.

The sixth object of the present invention is to provide a laser imaging device which is excellent in the color rendering property.

The present invention is based on the principle that a train of time-sequence video-signals corresponding to an original picture and received over a certain time interval are converted by a light modulating device comprising an acousto-optic medium into the spatial distribution of an optical property of the medium, to temporarily hold it within said medium, while pulse laser light of a short duration is illuminated on the medium in a manner to be synchronized in time with the video-signals, a part of the light being diffracted so that only undiffracted light or diffracted light emerging then from the medium may be projected on a screen, whereby an image corresponding in brightness to the original picture can be reproduced.

If a plurality of pulse laser light beams of different colors are used, and if the pulse light beams and the time-sequence video-signals of the respective color components are synchronized in time, a multicolor imaging device is provided.

The present invention itself and its further objects as well as advantages will be clearly understood from the following detailed description of the preferred embodiments taken in conjunction with the accompanying drawings.

DETAILED DESCRIPTION OF THE INVENTION

Description will now be made of a light modulating device for use in the present invention.

Among devices of this type, there are an acousto-optic light modulating device which uses the spatial inhomogeneity of the refractive index of light as is caused by acoustic waves propagated through a transparent liquid or solid medium, an electro-optic light modulating device which uses changes in the refraction and scattering characteristics of light as are caused when an electric field is applied to a transparent liquid crystal or electro-optic crystal, and so forth. The intensity of the acoustic waves or the electric field applied to the devices is controlled in response to video-signals, whereby a spatial distribution corresponding to the pattern of an original picture can be provided for the optical properties of the media.

The present invention takes advantage of the fact that the optical properties of the media composing the light modulating devices as described above can be externally controlled electrically, and that a pattern of a spatial distribution of optical constants within the media can be brought into correspondence, by electrically varying the spatial distribution, with a pattern composed of a train of time-sequence video-signals corresponding to the original picture.

The present invention is realizable with either the acousto-optic or electro-optic light modulating device. Since, however, the latter is disadvantageous in being complicated in construction as compared with the former, the present invention employs the former.

Embodiment 1

Figures 1, 2:
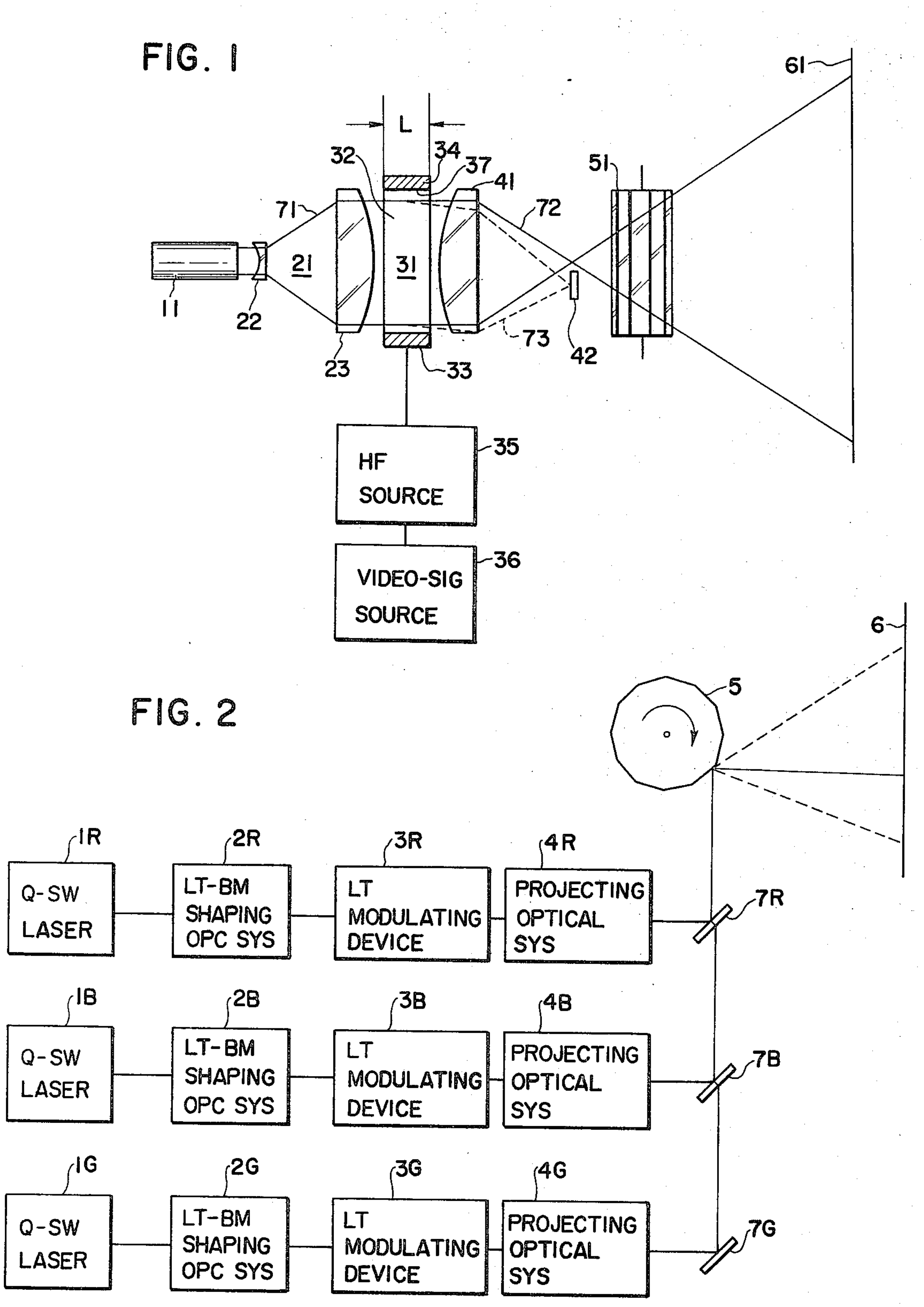
FIG. 1 is a schematic view for illustrating an imaging device of the present invention.
FIGS. 2 and 3 are block diagrams showing the constructions of multicolor imaging devices of the present invention, respectively.

Referring to FIG. 1, numeral 11 designates a pulse-operation laser using the Q-switching technique, 21 an incident optical system consisting of two cylindrical lenses 22 and 23 for obtaining wide parallel rays, 31 and acousto-optic light modulating device in which an elongated acoustic medium 32 is provided at its both ends with an electroacoustic transducer 33 and an acoustic-wave absorber 34, respectively, 35 a high frequency power source to generate acoustic waves, 36 a video-signal source, 41 a cylindrical lens constituting a part of a projection optical system, 42 a shielding mask of an opaque body which similarly constitutes a part of the projection optical system and which serves to shield diffracted light being unnecessary and emerging from the light modulating device 31, 51 a frame-scanning polygonal rotating mirror, and 61 a projection screen. Herein, the components 31 (32–34) and 35 constitute a light modulator. Suitable as the material of the acousto-optic medium 32 is one which is transparent and exhibits a low propagation loss, such as titanium oxide ($TiO_2$), lithium nionate ($LiNbO_3$), lithium tantalate ($LiTaO_3$), iodic acid ($HIO_3$), lead molybdate ($PbMoO_4$), tellurium oxide ($TeO_2$) and saphire ($Al_2O_3$). Of optical paths shown by solid lines, that 71 indicates incident light on the medium 32, while that 72 represents the locus of undiffracted light emerging from the medium 32 without being subjected to diffraction. Dotted lines 73 depict the locus of the emerging diffracted light (Bragg reflection light in the case). In the case of the embodiment, the unnecessary diffracted light 73 is shielded by the shield mask 42 placed at the portion of a focal plane of the lens 41. Only the undiffracted light 72 is reflected and has its direction changed by the polygonal rotation mirror 51, to reach the projection screen 61. The optical path is shown developed on the drawing. The rotating mirror 51 serving as the frame-scanning means may be substituted by a vibrating mirror or any other light deflecting means. With any means, no technically difficult problem is raised since, unlike the line scanning, the frame-scanning may be low in the scanning speed. Accordingly, the subject matter of the present invention that a high-speed rotating mirror for the line scanning is removed is not contradictory to the above construction at all.

The length of the direction of propagation of the acoustic wave within the acousto-optic medium 32, i.e., the length of the medium 32 from the acoustic transducer 33 to the acoustic-wave absorber 34, is set so as to be equal to a distance by which the acoustic wave is propagated in substantially one horizontal line scanning period of a video-signal (being usually represented by 1H, and being approximately 64 microseconds in the standard television broadcast).

The device operates as below. The acoustic transducer 33 adhesively stuck to one end of the acoustic medium 32 is driven by the high frequency generator 35. Then, propagating acoustic waves are generated within the medium 32, lead to an anti-reflection termination 37 at the other end, and are absorbed by the acoustic-wave absorber 34. When the output of the high frequency generator 35 is amplitude-modulated by the video-signal source 36, the acoustic waves are subjected to the amplitude modulation. The amplitude of the video-signal is converted into the intensity of the acoustic waves, and accordingly the magnitude of changes in the density and the refractive index of the medium 32. A train of the acoustic waves thus produced and having the pattern of an original picture is propagated from the lower part to the upper part of the medium 32.

Herein, at a specified time at which a video-signal equivalent, for example, to one scanning line of the television is held over the full length of the acoustic medium 32, in other words, at the moment at which the preceding horizontal blanking signal reaches the anti-reflection termination 37 and the succeeding blanking signal leaves the acoustic transducer 33, the laser light source 11 is pulse-operated by the Q-switching technique. The pulse light beam is shaped into the wide parallel rays by the laser-beam shaping optical system 21. Thereafter, it is caused to incide over the full length of the acoustic medium 32. Then, the incident pulse beam has its part diffracted by an acoustic wave front which is propagating through the medium 32.

In this case, if the width of the direction of propagation of the light beam within the acoustic medium 32 is suitable selected, and if the wavelength $\lambda$ of the pulse light beam, the wavelength $\Lambda$ of the acoustic wave and the angle $\theta$ of incidence of the light beam on the acoustic wave front are selected so as to fulfill the condition of the so-called Bragg reflection:

$$2 \sin \theta = \lambda/\Lambda \quad 1.$$

then the diffracted light emerges in the direction of the Bragg angle $\theta$ with sharp directivity.

The intensity of the diffracted light depends on the amplitude of the acoustic wave at a place at which the light beam is diffracted, and as will be stated below, under a certain condition, it is higher as the amplitude is larger. That is, the diffracted light is spatially modulated by the video-signal. The undiffracted light, i.e., that part of the incident light on the medium 32 which has not been diffracted, emerges in a direction different from that of the diffracted light. In the standard television system, a large amplitude of the video-signal corresponds to the dark level, while a small amplitude to the highlight level. Accordingly, if, as illustrated in the figure, the diffracted light 73 of the light beam emerging from the acoustic medium 32 and passing through the cylindrical lens 41 is intercepted by the shield mask 42, and only the undiffracted light 72 is projected on the projecting screen 71, then an image appearing on the screen 61 corresponds in the brightness to the original picture pattern, thus enabling the picture of one scanning line of the television to be reproduced. In order to adjust the width of the scanning line picture, it is desirable that the cylindrical lens 41 is weakly convergent in the plane perpendicular to the scanning line. The successive individual scanning lines have their positions shifted slightly therebetween in the direction orthogonal to the scanning lines by the polygonal rotating mirror 51, and thus, the field-scanning is carried out. Since, in this case, the repetition frequency of the pulse operation laser 11 and the rotating speed of the polygonal rotating mirror 51 are respectively controlled by the line-scanning and field-scanning synchronizing signals, a plane picture corresponding to the original picture is obtained on the screen 61.

In case where video-signals whose large amplitude corresponds to the highlight level and whose small amplitude corresponds to the dark level are adopted, the undiffracted light is blocked by the shield mask 42 while the diffracted is projected on the screen 61 in contrast with the above construction. Then, the dark and highlight levels correspond to those of the original picture.

The relationship between the amplitude of the acoustic wave and the intensity of the diffracted light is theoretically described as follows:

As shown in FIG. 1, the interaction length between the light beam and the acoustic wave, namely, the width of the acousto-optic medium 32 along the direction of the light propagation, is denoted by L. As stated previously, when the light permeates through the acoustic medium 32, it is diffracted by the acoustic wave propagated through the medium. It is well-known that the modes of diffraction called the Raman-Nath regime and the Bragg reflection regime are present in dependence on the mutual relations among the wavelengths of the light, the acoustic wave and the above-mentioned interaction length L. Now, considering the Bragg reflection regime for the sake of convenience of the explanation, the ratio between the intensity of incident light $I_o$ and the intensity of diffracted light I is represented by:

$$I/I_o = \sin^2 (1.4 L \sqrt{MP}) \text{ (MKS)} \quad 2.$$

where P denotes the acoustic power density, and M the acousto-optic figure of merit of the acoustic medium (in the relative value to water) and the wavelength is put equal to 0.633 micron as an example. That is to say, the intensity of diffracted light becomes higher with the intensity of acoustic wave. When the term within the parentheses on the right side of Eq. (2) is equal to $\pi/2$, the incident light is totally reflected, and the undiffracted light is null. Accordingly, if construction is made such that when the video-signal reaches the maximum amplitude (strictly, the dark level) the acoustic power density fulfills the above requirement, then the undiffracted light at that time becomes null. The dark level of the video-signal and that of the projected image can therefore be accurately brought into correspondence. Although the above description has been made of the Bragg reflection regime, the principle and the construction of a device are almost the same for the Raman-Nath regime.

Next, it is necessary to study the laser light source. One horizontal scanning time of the standard television system is approximately 64 microseconds, and the number of picture elements included therein is 300 to 400. The sweep time of one picture element is accordingly 150 to 200 nanoseconds. Unless a pulse illumination shorter than such period is utilized, the acoustic wave is shifted in its propagating direction within the light-illuminating period, to render the image obscure. In general, letting H be one horizontal scanning time and N be the number of picture elements included therein, the light-illuminating time should be shorter than H/N. Furthermore, the required light output of the laser light source is related to the size and brightness of the screen. Assuming that the necessary luminous flux is 1,000 lumens, there are required as the time average values of the light output at least approximately 2 watts in the green region of high luminous efficiency and at least approximately 10 watts in the red or blue region of low luminous efficiency. Such intense and short pulse-operated light can be produced by the so-called Q-switche operation of ruby laser, neodymium ion laser, or other lasers.

In the above, description has been made by way of example of the monochromatic imaging device using the single laser, according to the present invention. With the principle, a multicolor imaging of excellent color rendering property can be easily realized. In this case, laser light sources for use in the multicolor display should fulfill the foregoing requirements, and simultaneously, their oscillation wavelengths should be suitable to compose the three primary colors. Such multicolor imaging device will be explained hereunder.

Embodiment 2

A laser containing the trivalent ion of neodymium (Nd) as an active material, which is doped in the host material, such as, a yttrium aluminum garnet ($Y_3Al_5O_{12}$) crystal, a yttrium aluminate ($YAlO_3$) crystal, or the like, generated red, green and blue light emission in such way that its infrared light emission is converted into the second harmonic waves by the use of an appropriate nonlinear optical crystal. Since the wavelength coincide well with the three primary colors of the standard color television system, the laser is suitable as the light source for use in the multicolor imaging device of the present invention. Suitable as the nonlinear optical crystal for the frequency conversion is the crystal of lithium iodate ($LiIO_3$), barium sodium niobate ($Ba_2NaNb_5O_{15}$), cesium dihydrogen (or dideuterium) arsenate (CDA, D-CDA), or the like.

The construction of the three primary-color imaging device of the present invention as employs the above, three primary-color, Q-switch laser light source is shown in block in FIG. 2.

Referring to the figure, 1R, 1B and 1G designate Q-switched laser light sources which present red, blue and green light emissions, respectively. 2R, 2B and 2G indicate light-beam shaping optical systems. Shown at 3R, 3B and 3G are light modulators, in which the direction of propagation of acoustic waves is set to be perpendicular to the drawing. 4R, 4B and 4G represent projection optical system of the respective colors, while 7R, 7B and 7G constitute a light-beam combining optical system. Reference numeral 5 denotes a polygonal rotating mirror, while 6 a projection screen. The light modulators 3R, 3B and 3G are applied thereto with video-signals of red, blue and green, respectively. Simultaneously therewith, they receive light illuminations from the laser light sources 1R, 1B and 1G of red, blue and green, respectively. Thus, on the basis of the principle having been stated in Embodiment 1, a picture of each color as corresponds to one horizontal scanning line is reproduced. In the illustrated case, the scanning line is perpendicular to the drawing. The light-beam combining optical system is composed of the three reflectors 7R, 7B and 7G, among which the reflector 7R is reflective to red light rays and transparent to blue and green light rays, the reflector 7B is reflective to blue light rays and transparent to green light rays, and the reflector 7G is reflective to green light rays. The reflector having such wavelength dependence can usually be constructed of a dielectric multilayer. Images reflected by the three mirrors are combined so as to be superposed on a straight line on one another, and are subsequently caused to incide on the polygonal rotating mirror 5. The polygonal rotating mirror 5 is a rotating mirror in which each side of a polyhedron is a plane mirror. It rotate at a constant speed about an axis perpendicular to the drawing, and the rotational motion is synchronized with the vertical scanning synchronizing signal of the television. Since the laser light beam accordingly sweeps the projection screen 6 vertically, successive individual scanning lines are moved in the vertical direction. A perfect plane picture corresponding to the original picture is thus reproduced on the screen 6. In this case, each laser light source repeats the pulse light emission once for one horizontal scanning and in a manner to be always synchronized with the horizontal synchronizing signal.

Although the embodiment adopts the method of combining the tricolor picture with the reflecting mirror, the combination with a prism is also possible. In addition, the vertical scanning may also be conducted using a vibrating mirror instead of the rotating mirror. It is easily conjectured that the display method as in the embodiment is also applicable to monochromatic, dichroic or any other multicolor pictures. Further, the principle of the present invention is applicable not only to the standard television system, but also to any other desired systems. It should accordingly be borne in mind that the "horizontal scanning line" in the previous explanation is an expression signifying the scanning line in the case of scanning the picture screen, and that it is not restricted in the direction, but that merely it is in the horizontal direction in the standard system.

Although, in the foregoing embodiment, the separate light modulators for the respective primary colors are used for the multicolor imaging, it is also possible to conduct multiple modulation of a multicolor image with a single light modulator. To this end, the principle of the Bragg reflection as indicated by the condition of Eq. (1) is applied. Let it now be supposed that a tricolor picture is displayed and that an incident laser light beam has three wavelength components $\lambda_R$, $\lambda_B$ and $\lambda_G$ corresponding to the respective three primary colors. Such multicolor laser beam can be easily obtained by combination of monochromatic laser beams as will be hereinafter stated. On the other hand, it is assumed that three kinds of acoustic waves of different wavelengths coexist within an acoustic medium. To this end, a vibrator may be excited by a high frequency electric signal having three different frequency components. The wavelengths are respectively let to be $\Lambda_R$, $\Lambda_B$ and $\Lambda_G$. Here, the acoustic wave of the wavelength $\Lambda_R$ is intensity-modulated by a red video-signal. Similarly, the acoustic waves of the wavelengths $\Lambda_B$ and $\Lambda_G$ are modulated by blue and green video-signals, respectively. If the various factors are selected so as to satisfy the following condition:

$$2 \sin A = \lambda R/\Lambda R = \lambda B/\Lambda B = \lambda G/\Lambda G \qquad 3$$

the Bragg reflection condition is fulfilled for each color. The laser beam of each component is intensely reflected by the acoustic wave corresponding to the particular color, and the emerging directions of the laser beam components of the three colors are uniform. In this way, the multicolor laser beam is multiple-modulated by multicolor video-signals coexistent in the single light modulator, and a multicolor image is produced.

Embodiment 3

A laser oscillating line near a wavelength of 1.06 microns emitted in the foregoing neodymium laser by the transition between two levels $^4F_{3/2}$ and $^4I_{11/2}$ of the trivalent ion neodymium is converted into the second harmonic wave using a suitable nonlinear optical crystal. Thus, green light of a wavelength of approximately 0.53 micron is obtained. A laser oscillating line near a wavelength of 1.32 microns owing to another transition of the trivalent ion of neodymium from $^4F_{3/2}$ to $^4I_{13/2}$ is similarly converted into the second harmonic wave. Thus, red light of a wavelength of approximately 0.66 micron is obtained. The green light and the red light are suitable as green and red primaries.

As regards a laser light source for the remaining one of the three primary colors, i.e., blue, laser oscillating lines of the trivalent ion of neodymium include therein one which attains blue light in the form of the second harmonic wave as in the described manner, and which can be utilized in the present invention. Since, however, the oscillating line is of a low conversion efficiency at the normal temperature and requires a low temperature in order to raise the efficiency, it is somewhat inconvenient from the viewpoint of practical use.

Therefore, the embodiment does not employ a specific laser light source for the blue-primary color, but produces blue light from the light output of the laser for the red-primary color having relatively few technical problems and in conformity with the parametric optical-mixing technique. As is well-known, the optical mixing is a phenomenon in which when two light waves having frequencies $f_1$ and $f_2$ are mixed within a nonlinear optical crystal, two light waves having a sum frequency $f_1 + f_2$ and a difference frequency $[f_1 - f_2]$ are generated. Now, when the above-mentioned light having a wavelength of 1.32 microns is used as the light of the frequency $f_1$ and the light being the second harmonic wave thereof and having a wavelength of 0.66 micron is employed as the light of the frequency $f_2$, light having a wavelength of 0.44 micron is achieved as their sum frequency light. This wavelength has suitability as the blue-primary color in the standard color television system.

In order to efficiently carry out the frequency conversion based on the optical mixing, it is required that the respective wavelength light rays concerned fulfill the so-called phase matching condition within the nonlinear optical crystal. It has been revealed that the condition is satisfied when, using a single crystal of lithium iodate as the nonlinear optical crystal, light is caused to incide at an angle of 34° with respect to the optical axis thereof. Even with other crystals than lithium iodate, the phase matching condition may be fulfilled by suitably setting the angle of incidence of the light or the temperature of the crystal.

Figures 3, 4:
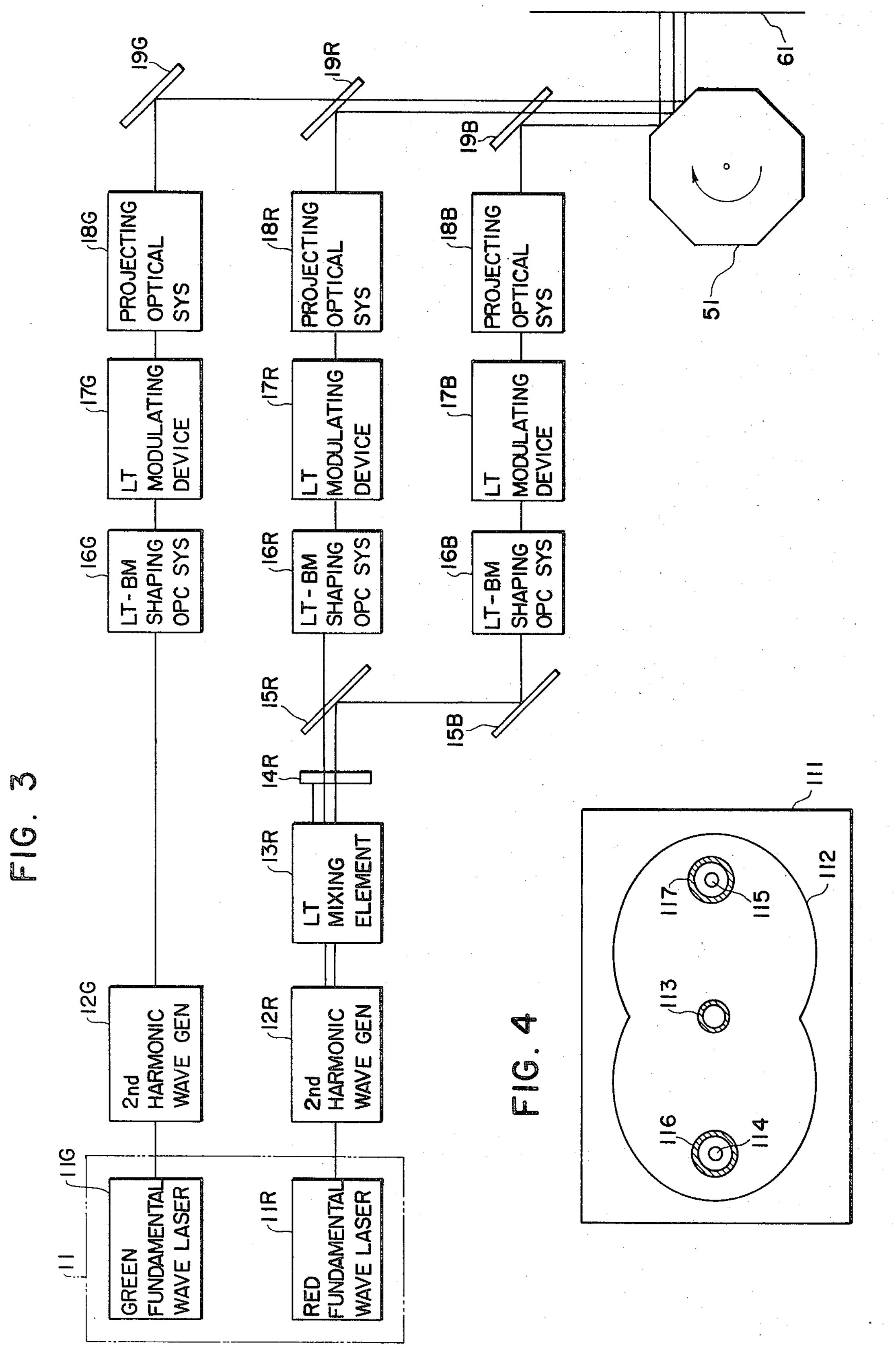
FIGS. 4 and 5 are schematic sectional views showing the constructions of nodymium ion lasers for use in the present invention, respectively.

The multicolor imaging device of the present invention as employs the foregoing three primary-color laser light source will now be described in conjunction with FIG. 3.

Referring to the figure, numeral 11 indicates a laser light source which includes two parts, i.e., a green fundamental wave laser 11G which emits an oscillating line near a wavelength of 1.06 microns owing to the transition $^4F_{3/2} \rightarrow {}^4I_{11/2}$ of a trivalent neodymium ion, and a red fundamental wave laser 11R which emits an oscillating line near a wavelength of 1.32 microns owing to the transition $^4F_{3/2} \rightarrow {}^4I_{13/2}$ of the trivalent neodymium ion. Shown at 12G and 12R are second harmonic-wave generators for obtaining green light and red light from the light rays of the two kinds of wavelengths, respectively. By passing through the generators, the green fundamental wave near the wavelength of 1.06 microns is converted into green light having a wavelength of approximately 0.53 micron, while a part of the red fundamental wave near the wave-length of 1.32 microns is converted into red light having a wavelength of approximately 0.66 micron. The light rays thus generated and consisting of the two wavelength components of approximately 1.32 microns and 0.66 micron are passed through an optical-mixing element 13R, thereby being converted into three component light rays which, in addition to the two components, include blue light of a wavelength of approximately 0.44 micron being their sum frequency light. Unnecessary infrared rays are removed by a filter 14R. The red light and blue light passing through the filter are separated by a dichroic mirror 15R, so that the red light permeates therethrough, and that the blue light is reflected herein to be further reflected by a reflector 15B. Through the above process, the three primary color-laser light rays consisting of the red light, the blue light and the foregoing green light is obtained. Via the respective incident optical systems 16G, 16r and 16B, the laser light rays of the respective colors incide on the respective acousto-optic light modulators 17G, 17R and 17B. Green, red and blue video-signals are supplied to the light modulators 17G, 17R and 17B, respectively, and the incident light rays are modulated on the basis of the principle previously stated. Emergent light rays from the light modulators 17G, 17R and 17B pass through the respective emergent optical systems 18G, 18R and 18B, and propagate via a light-ray combining optical system consisting of a reflector 19G and dichroic mirror 19R and 19B. Further, they are projected as a multicolor image on a screen 61 by a field-scanning polygonal rotating mirror 51. Although the light rays of the different wavelengths are slightly shifted and illustrated in the drawing, the images of the three colors are actually in the perfect superposition on the screen, and any problem associated with the so-called registration is not raised.

Figures 5, 6:
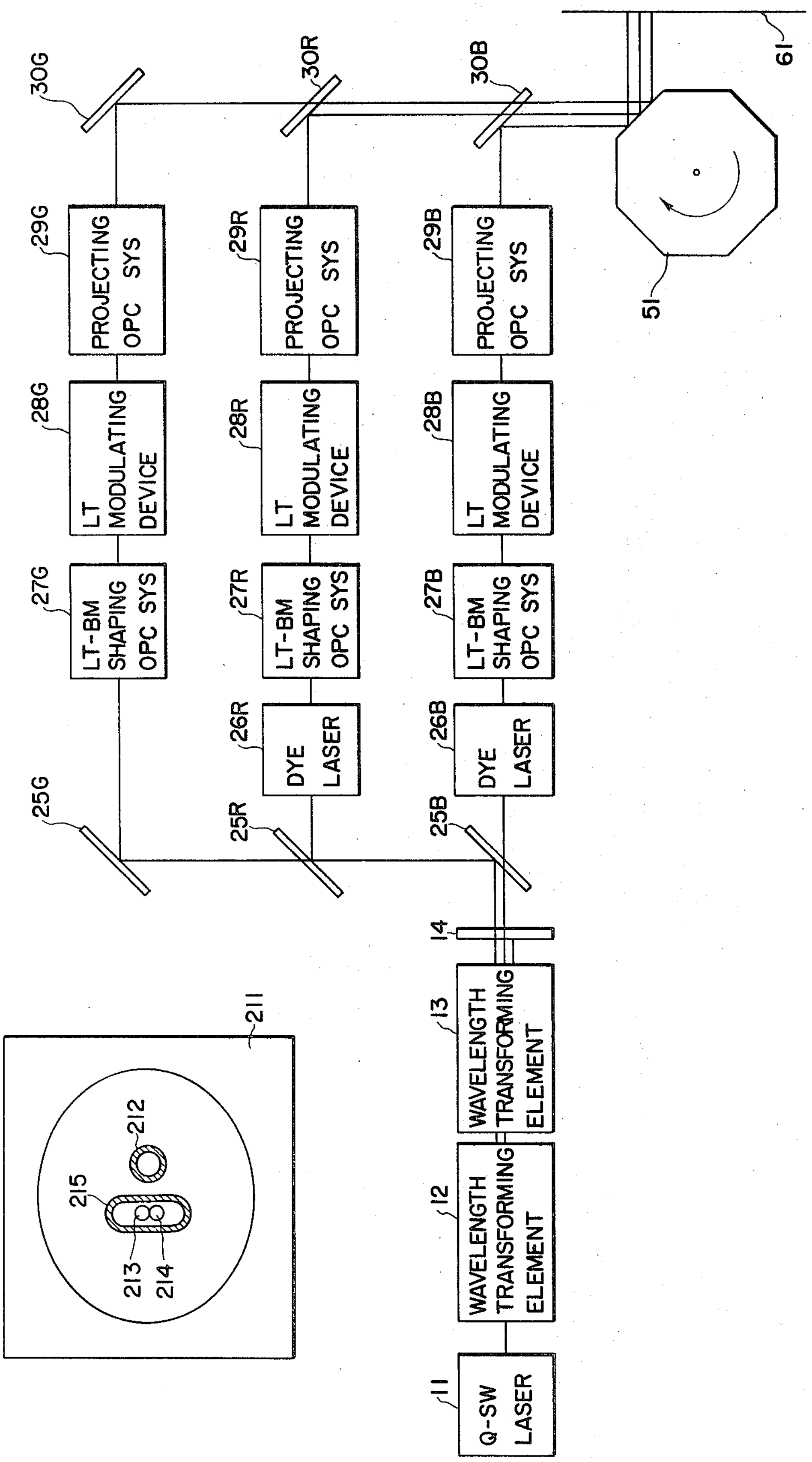
FIG. 6 is a block diagram showing the construction of another multicolor imaging device of the present invention.
Figure 7A:
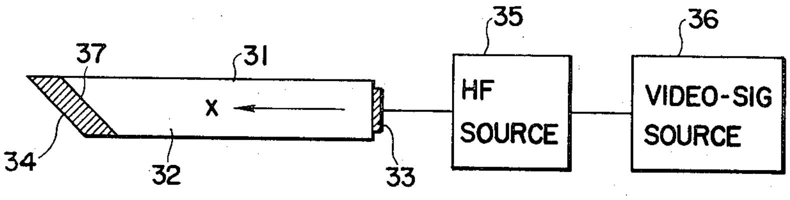
FIGS. 7(*a*) to 7(*d*) illustrate a light modulator for use in the present invention, in which FIG. 7(*a*) is a schematic view showing the construction thereof, FIG. 7(*b*) is a diagram showing the spatial distribution of acoustic wave amplitudes in an acousto-optic medium, FIG. 7(*c*) is a diagram showing the time dependence of acoustic wave amplitudes transmitted from an electro-acoustic transducer into the acousto-optic medium, and FIG. 7(*d*) is a diagram showing the spatial distribution of acoustic wave amplitudes in the acoustic medium in the case of applying the present invention.
Figure 7B:
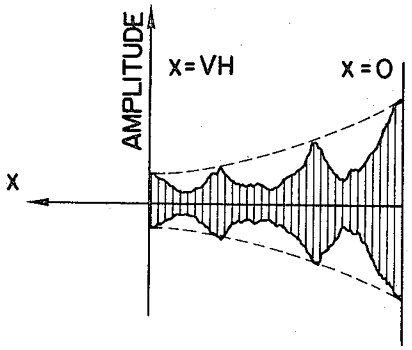
Figure 7C:
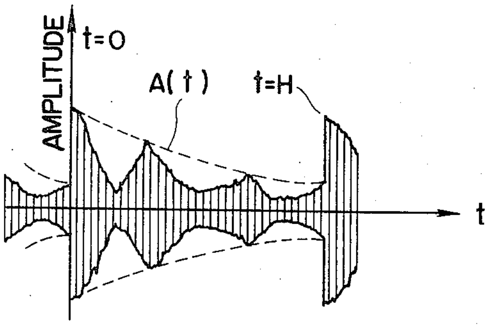
Figure 7D:
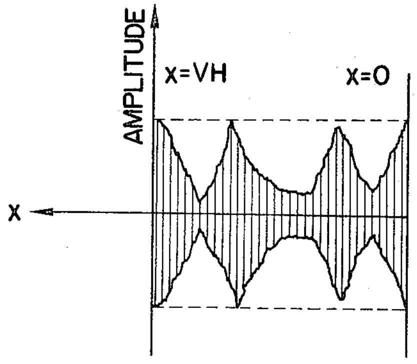

The lasers for generating the green fundamental wave and red fundamental wave stated above, will now be described more in detail. They are constructed as shown in FIG. 4 or FIG. 5. The drawings are sectional views taken perpendicularly to the optical axis. Referring to FIG. 4, numeral 111 indicates a double elliptical cylinder cavity, whose inner surface 112 is made a reflector. A pumping light source 113 is arranged on a common focal line of two elliptical cylinders, while active media 114 and 115 of the lasers on different two focal lines. The active media are rods of, for example, yttrium aluminum garnet doped with neodymium. The circumferences of the respective rods are surrounded by light-transmitting cylindrical jackets 116 and 117 so as to form passages of a coolant. Of the two rods of the laser active media, one oscillates at the green fundamental wave, and the other at the red fundamental wave. The selection of the oscillation wavelengths is determined by the spectral property of a laser cavity disposed on each optical axis, although it is not shown in the figure. As the pumping light source 113, there can be utilized a tungsten incadescent lamp, a krypton arc lamp, an alkali-metal vapor lamp, etc. In case of the metal vapor lamp, it is desirably lit by an alternating current power supply in order to prevent sealed in-tube materials from being separated due to cataphoresis. In such case, the power supply and a power-feeding circuit are arranged so that a discharge current flowing through the lamp mah become a square-wave alternating current, the repetition frequency is synchronized with the field-scanning frequency, and further, the rise time of the square wave is made shorter than the blanking time of the field-scanning, whereby the output power of the laser beam can be made substantially constant during the picture-frame scanning period. FIG. 5 illustrates a construction using a single elliptical cylinder cavity 211. A pumping light source 212 is disposed on one focal line, while two rods 213 and 214 of active media doped with neodymium are arranged on the other focal line in a manner to be surrounded by a cooling jacket 215. The remaining points are similar to those of the case of FIG. 3.

In the above explanation, the example has been given in which the blue light is obtained from the light of the wavelength of approximately 1.32 microns being the fundamental wave output of the red fundamental wave laser light source, and the light of the wavelength of approximately 0.66 micron being the second harmonic wave of the fundamental wave light. If the same principle of the frequency conversion is applied to different wavelengths, light rays of different wavelengths are obtained. For example, with the optical mixing between wavelengths of 1.32 microns and 0.53 micron, light having a wavelength of 0.38 micron is obtained. With the optical mixing between wave-lengths of 1.06 microns and 0.53 micron or 0.66 micron, light rays respectively having a wavelength of 0.35 micron or 0.41 micron are obtained. In order to bring the shorter wavelength light rays into correspondence with the blue primary color light, it is desirable that they are converted into wavelengths of a higher luminous efficiency by, e.g., coating a suitable fluorescent material on the screen. Further, orange light having a wavelength of 0.59 micron is obtained from light rays of wavelengths of 1.32 microns and 1.06 microns.

the numerical values of the wavelengths used in the above explanation are not strict, but it should be borne in mind that a number of proximate lines are present near the mentioned wavelengths on account of the energy level structure of the neodymium ion. The first characterizing feature of the imaging device according to this embodiment is that the neodymium ion laser having a high conversion efficiency and appropriate output light wavelengths is employed as the light source. The second characterizing feature is that the blue-primary color light is geneated through the optical mixing from the fundamental-wave oscillating light near the wavelength of 1.32 microns and the red light being the second harmonic wave thereof. More specifically, the two wavelengths of red and blue are obtained by the frequency conversion from a single wavelength light produced by a single laser. If a laser capable of generating the green-primary color light is added thereto, the three primary colors are all furnished. Thus, a multicolor imaging device can be attained which is provided with a laser light source having a comparatively simple construction and a high conversion efficiency. The third characterizing feature is that the acousto-optic light modulators are employed in the special mode of use as has been already stated, whereby continuous images can be reproduced even with a pulse operation laser. This is an image reproducing method being quite different in mode from that of a prior-art laser television projector in which a continuous wave laser is temporally modulated in time sequence by video-signals. The neodymium ion laser is advantageous in that a pulse light beam of short duration and high peak height is easily obtainable by the Q-switch operation. Further, in case of the frequency conversion by the non-linear optical effect, as the incident light is stronger, the conversion efficiency is higher. When, therefore, comparisons are made at the same degree of average power levels of the incident light, the pulse wave is far more advantageous in the efficiency of the frequency conversion than the continuous wave.

Since the laser beam is excellent in directivity, the output light can be effectively led to the screen. In addition, since it is excellent in monochromaticity, the color purity of an image is excellent, and the color reproducible range is widened. Thus it is apparent that the coherent property of the laser beam is advantageous in order to reproduce an image through light diffraction.

Embodiment 4

The green light of a wavelength of approximately 0.53 micron obtained, as has also been stated in Embodiment 3, in such way that the laser oscillating line near a wavelength of 1.06 microns as emitted by the transition between the two levels $^4F_{3/2}$ and $^4I_{11/2}$ of the trivalent neodymium ion is converted into the second harmonic wave by the use of a suitable nonlinear optical crystal, best satisfies the foregoing various conditions. That is, the green light thus obtained is well coincident in the chromaticity diagram with the green primary color of the standard system color television broadcast.

Laser light sources of the other two primary colors, namely, red and blue, are required for the multicolor display. To this end, the embodiment subjects the green light to the frequency conversion to thereby obtain the two laser light beams. More concretely, the embodiment is characterized in that a dye laser excited for oscillation by the above laser light is used as a light source. The second harmonic wave (having a wavelength of approximately 0.53 micron) of the output light of the neodymium laser is used as pumping light, and a solution of a fluorescent dye is used as an active medium, whereby red laser light can be obtained. Suitable as the dyes are rhodamine dyes, cresyl violet, and in general, those belonging to the groups of polymethine dyes, xanthine dyes, acrydine dyes, etc. With laser using the dyes, oscillating wavelengths are tunable over a wide range. By utilizing the property, it is accordingly enabled to select the oscillating wavelengths at a wavelength region in which the luminous efficiency to the eyes is high and which is suitable as the red primary color, i.e., a region from 0.62 to 0.66 micron. The degree of freedom for the selection of such wide wavelength range is not present in other kinds of laser. Another advantage in the case of using the dye laser is that, as a property essentially possessed by dye molecules, the life time of an excited level is short. As a result, the dye laser has an extremely suitable property for the light source of the imaging device of the present invention, in which are required that the pumping light is a light pulse of short duration and that the laser light is also a light pulse of short duration.

Next, a method for producing blue-primary light is stated. Although suitable wavelengths for blue-primary light are in a region shorter than a wavelength of 0.47 micron, they are desirably be longer than a wavelength of 0.44 micron when the luminous efficiency to the eyes is taken into consideration. Suitable as dyes capable of oscillating within the wavelength region are a chemical derivative obtained by substituting hydrogen of a coumarine molecule by another radicals, an organic scintillator, and so forth. In order to excite the dyes, pumping light whose wavelength is in the near ultraviolet region is required. As a method to satisfy the requirement, the parametric optical-mixing method is again used in this embodiment. More specifically, when the light of a wavelength of approximately 1.06 micron being the fundamental wave output of the neodymium laser and the light of a wavelength of approximately 0.53 micron being the second harmonic wave of the fundamental wave are caused to simultaneously incide on the nonlinear optical crystal such as lithium iodate, light of a wavelength of approximately 0.35 micron corresponding to the sum frequency between both the incident lights emerges. The ultraviolet light is suitable as the pumping light of the dye laser for the blue primary color. The special qualities of the dye laser that oscillating wavelengths are tunable in wide range and that the width of the light pulse is narrow, are also preferable properties as the light source for the blue primary color as has been stated in connection with the dye laser for the red primary color.

Another method for obtaining the blue primary color consists in that either ultraviolet light of the sum frequency light (having the wavelength of approximately 0.35 micron as mentioned above) or of the fourth harmonic wave (having a wavelength of approximately 0.27 micron) obtained by further frequency doubling of the second harmonic wave of 1.06 microns light is used as the blue-primary light. In this case, it is required to coat an appropriate fluorescent material for the blue primary color, e.g., a blue-emitting fluorescent material containing europium (Eu) as an active medium, on the screen and to thus convert the ultraviolet light into visible light.

A concrete embodiment of the imaging device of the present invention as employs the laser light source described above, is illustrated in FIG. 6. Referring to the figure, numeral 11 designates a neodymium ion laser of the Q-switching operation. An optical cavity belonging thereto is constructed so that the laser may oscillate at a wavelength near 1.06 micron. The oscillation light has its part converted into the second harmonic wave of a wavelength of 0.53 micron by a wavelength converter 12 which is made of a suitable nonlinear optical crystal. The light of the two wavelength components thus produced and consisting of the infrared fundamental wave of the wavelength of approximately 1.06 micron and the green, second harmonic wave of the wavelength of approximately 0.53 micron, is subjected to optical mixing by the second wavelength converter 13. Thus, in addition to the two wavelength components, ultraviolet light corresponding to the sum frequency of the two components and having a wavelength of approximately 0.53 micron is produced. Next, unnecessary infrared light is blocked by a filter 14. Of the green light and the ultraviolet light transmitted through the filter, the former is reflected by a dichroic mirror 25B, while the latter is transmitted therethrough to pump a dye laser 26B for a blue primary light source. A part of the green light is reflected at a semitransparent mirror 25R to pump a dye laser 26R for a red primary light source, while the other part is reflected at a total reflection mirror 25G to be utilized as the green primary light. The oscillating light outputs of the dye lasers 26B and 26R are utilized as the blue primary light and the red primary light, respectively. The respective primary color light beams are passed via incident optical systems 27B, 27R and 27G, and incide on acousto-optic modulating devices 28B, 28R and 28G which are modulated by video-signals corresponding to the respective primary color light beams. Emergent light beams subjected to the modulation are passed via emergent optical systems 29B, 29R and 29G, and are combined by a light-beam combining optical system which comprises dichroic mirrors 30B and 30R and a total reflection mirror 30G. The combined beam is reflected by a field-scanning polygonal rotating mirror 51, and is projected on a screen 61 to reproduce a picture.

Although, in the figure, the light beams of different wavelengths are represented by slightly shifted lines in order to facilitate the understanding, the images of the three primary colors are actually in the perfect superposition on the screen, and any problem on the socalled registration is not raised.

In the embodiment, description has been made of the case where the dye laser excited by the ultraviolet incident light and oscillating in the blue light region is used as the laser 26B for the blue primary color light source. It is also possible to use the pumping ultraviolet light itself as the blue primary color light. In this case, the dye laser 26B is removed, and instead, a fluorescent material adapted to emit blue light by the ultraviolet excitation is coated on the surface of the screen 61. The remaining construction is as has been already stated.

The characterizing feature of the imaging device according to this embodiment is that, owing to the wavelength conversion using the dyes or other fluorescent materials, a multicolor imaging device having a plurality of a primary light sources can be realized as in the previous embodiment. Particularly, the dye laser light source is greatly advantageous in that it is suitable to the operation in the pulse oscillating form, and that its oscillating wavelengths can be set at the most appropriate values as viewed from both the luminous efficiency and the color rendering property. In addition to these advantages, advantages as in Embodiment 3 are also brought about.

The imaging device according to the present invention as thus far described, has extensive applications such as the television, the facsimile, and the output data display of a computer. In systems, such as a facsimile equipment, in which printing paper is movable in the direction orthogonal to that of the line scanning, the frame-scanning rotating mirror may be omitted from the constituting elements.

Embodiment 5

In all the imaging devices according to the present invention as have been described above in detail, the acousto-optic light modulator using the acoustic medium is included as the principal constituting element. Usually, acoustic waves are attenuated as they are propagated through the medium. For this reason, an acoustic wave having had an intensity equivalent to the dark level at the moment at which it was transmitted from an electroacoustic transducer into the medium, no longer corresponds to the dark level when it reaches an anti-reflecting termination. This will be explained more in detail. FIG. 7(*a*) is a diagram showing the construction of an acousto-optic light modulator for use in the present invention. Referring to the figure, numeral 31 indicates a light modulating device in which an acoustic transducer 33 and an acoustic wave absorber 34 are respectively attached to both ends of an acoustic medium 32. Unlike that in FIG. 1, an anti-reflecting termination 37 is obliquely formed in this case. Reference numeral 35 designates a high-frequency power source, while 36 a video-signal source. It is now supposed that the acoustic medium 32 has a length substantially corresponding to 1H, and that coordinates $x$ represent the distance along the acoustic wave propagation within the medium 32. FIG. 7(*b*) illustrates the state of attenuation of the amplitudes of acoustic waves within the medium 32, and dotted lines depict the envelope of the maximum amplitudes of the acoustic waves. Even if, in an image illuminated and projected under such state, the dark level of a video-signal corresponds accurately to a dark portion of a picture at a certain part of the image, light leakage results at another part notwithstanding that the signal is at the dark level. Such light leakage leads to hindering faithful reproduction of the original picture.

The embodiment makes it possible to eliminate such disadvantage. To this end, according to the embodiment, the high frequency power source 35 and the video-signal source 36 shown in FIG. 1 and FIG. 7 are constructed to have characteristics as will be described hereunder. The output (strictly, the dark level output) of the high frequency power source 35 is so made that it is not constant versus time, but that when viewed in respect of a scanning line, it decreases from the leading end towards the trailing end thereof, so as to return to the original output level again at the leading end of the succeeding scanning line. Such mode of video-signals is illustrated in FIG. 7(*c*). The axis of abscissas in the figure represents time. If the amplitudes of signals of the high frequency power source are thus modulated and if the rate of the attenuation of the amplitudes versus time is set so as to compensate for the attenuation of the amplitudes shown in FIG. 7(*b*), the dark level amplitude of the acoustic waves can be made constant over the entire region in the acoustic medium 32 as is illustrated in FIG. 7(*d*). The condition for such state can be expressed as below. Changes in the dark level amplitude of an acoustic wave transmitted from the acoustic transducer 33 are represented by $A(t)$, where the origin of time $t$ is the time of the initiation of one line scanning, which terminates at $t = H$. The wave front of the acoustic wave transmitted at an amplitude $A(t)$ from the acoustic transducer at a certain time $t$ is propagated through the acoustic medium after lapse of a period of time $t'$ by a distance:

$$x = V t' \ (V\text{: sound velocity}) \tag{4}$$

The amplitude is assumed to be subjected to an attenuation corresponding to a multiplication factor $f(x)$ as compared with that at $x = O$. That is, the amplitude is $A(t) \cdot f(x)$. If the time of the termination of one line scanning is noticed, $$t + t' = H \qquad 5.$$

The amplitude distribution at that time is:

$$A(t) \cdot f(x) = A(t) \cdot f\,[V\,t'] = A(t) \cdot F\,[V(H - t)] \qquad 6.$$

Accordingly, in order that the amplitude distribution may be constant independent of $x$, in other words, independent of the time $t$ at which the wave front leaves the acoustic transducer, the following condition should be satisfied:

$$A(t) \cdot f\,[V(H = t)] = \text{const.} \qquad 7.$$

This is the condition sought for.

As a concrete example, in case where the amplitude of the acoustic wave is exponentially attenuated by an atrenuation factor $a$ with respect to the propagation distance $x$, i.e., where:

$$f(x) = exp\ (-ax) \qquad 8.$$

the condition of Eq. 7. becomes:

$$A(t)\ exp\ [-a\ V(H - t)] = \text{const.} \qquad 9.$$

Accordingly, the dark level amplitude can be made uniform over the full length of the acoustic medium by modulating the acoustic wave so that the dark level amplitude may vary relative to time in the form of:

$$A(t) = C \cdot exp[a\ V(H-t)] \quad 10.$$

where $C$ is a constant.

Herein, the constant $C$ is an amplitude $A(H)$ which gives the wave front at $t = H$ or $x = O$. $A(H)$ is selected so as to be equal to the dark level amplitude. More specifically, the acoustic power density P is suitably set, so that incident light may be fully diffracted to render undiffracted light null when the amplitude of the acoustic wave is $A(H)$. When it is desired to bring the large amplitude of the acoustic wave into correspondence with the highlight level in contrast to the standard television system, $A(H)$ may be caused to correspond to the highlight level. In case where the standard television system is conformed to, the image is projected by undiffracted light, and hence, unless the amplitude control of the acoustic wave is accurately made, it is feared that the light leakage occurs at a place which ought to be at the dark level. On the other hand, in case where the image is projected by diffracted light in constrast to the standard television system, the zero of the amplitude of the acoustic wave always corresponds to the dark level of the image, and hence, it is little feared for the light leakage to occur. In this case, inhomogeneity in the highlight level amplitude of the acoustic wave brings about irregularity in the brightness and color of the picture frame. Since, however, the human eyes are more sensitive to the light leakage at the dark level than to such irregularity, the reverse system is more advantageous than the standard system from this point of view. It can be accomplished with a simple electronic circuit to produce from a video-signal of the standard system a signal which is inverted in the brightness. No considerable difference in the technical difficulty is accordingly brought about with either system.

Now, as a more concrete example, a case is considered where the acoustic medium is made of iodic acid. The sound velocity in the medium is $V = 2.44 \times 10^5$ cm/sec, and the length of the medium as corresponds to one scanning line of the standard television system ($H = 63.5 \times 10^{-6}$ sec) is $V \cdot H = 15.5$ cm. If the attenuation factor of the acoustic power due to absorption of the medium and the diffraction loss is estimated to be approximately 0.25 db/cm at a frequency of 50 MHz, the attenuation of the acoustic power over the full length of the medium is approximately 4 db. Accordingly, in order to compensate for the attenuation, an attenuation of a factor of 0.63 may be given between the initial value and the terminal value of the amplitude $A(t)$. In this case, the attenuation factor of Eq. (8) is:

$$a = 0.029\ \text{cm}^{-1}$$

and the time dependence of $A(t)$ becomes, from Eq. (10), as follows:

$$A(t)\ \alpha\ \exp\ (-7 \times 10^{-3}\ t) \quad 11.$$

Although, in the above description, the case where the acousto-optic diffraction falls into the Bragg reflection regime has been given as an example, the acousto-optic effect falls into the so-called Raman-Nath regime in some cases in dependence on the way of selecting the related parameters. To the operation in either regime, the present invention is applicable.

The characterizing feature of the imaging device according to this embodiment is the possibility of providing an imaging device suitable to reproduction of high quality pictures, in which the highest level of brightness is uniform over the entire area of the picture frame and in which there is no fear of the light leakage occurring at a place of the lowest (dark) level.

In the foregoing description, the terms "the dark level" or "the highlight level" signify the maximum of minimum brightness level of an image, or an acoustic or electric signal representative of an image. However, it is apparent that the amplitude distribution in the medium can also be made uniform in respect of any desired half-tone level.

Owing to the special combination between the acousto-optic light modulator and the pulse operation laser, the imaging device of the present invention does not require the high-speed light deflector for the line scanning and the continuous wave laser as in the prior-art systems, and enables a larger screen display than with the cathode ray tube television receiver.

I claim:

1. An imaging device in which a spatial picture corresponding to an original picutre is reproduced from a time-sequence video-signal corresponding to said original picture, said device comprising means with which an acoustic wave propagated through an acousto-optic medium is modulated by said time-sequence video-signal, thereby to convert a time-sequence distribution of said video-signal into a spatial distribution of an optical property of said medium, means which irradiates pulse laser light beam having wavelength of ultraviolet range on said medium and which emits said light beam in a manner to be synchronized in time with said video-signal, and means which convert said ultraviolet light emitted from said medium to visible light on the projection screen.

2. An imaging device in which a spacial picture corresponding to an original picture is reproduced from a time-sequence video-signal corresponding to said original picture, said device comprising means with which an acoustic wave propagated through an acousto-optic medium is modulated by said time-sequence video-signal, thereby to convert a time-sequence distribution of said video-signal into a spatial distribution of an optical property of said medium, and means which irradiates pulse laser light beam on said medium and which emits said light beam in a manner to be synchronized with said video-signal, wherein the emitting time of said light beam is not greater than H/N, where H is the line scanning time defined as a duration of the video-signal in which a scanning line of the spatial picture is involved, and N is the number of the picture elements contained in said scanning line.

3. An imaging device according to claim 2, wherein the length of said acousto-optic medium is nearly equal to the distance which the acoustic wave propagates through said medium during said line scanning time.

4. An imaging device according to claim 3, wherein said laser means produces pulses spaced in time from each other equal to the line scanning time, and including means for deflecting the laser light beam emerging from said acousto-optic medium an amount equal to the distance between successive lines during the scanning time and in the direction as measured transverse to the lines with respect to the spatial picture.

5. An imaging device according to claim 3, including an optical means for diverging the laser beam to the length of the acousto-optic medium and further optic means for converting the diverging laser beam of said length to a parallel laser beam of said length prior to said laser beam reaching said acousto-optic medium.

6. An imaging device according to claim 2, including a high frequency power source for producing an acoustic wave to be modulated, and means which compensates for attenuation of said acoustic wave propagated through said acousto-optic-medium in such a manner that the high-frequency power source exciting said acoustic wave is so made that, when viewed in respect of one scanning line, the power output of said source decreases from the leading end towards the trailing end thereof, so as to return to the original output level again at the leading end of the succeeding scanning line.

7. An imaging device according to claim 6, wherein said frequency conversion means comprises a nonlinear optical crystal selected from the group consisting of lithium iodate, barium sodium niobate, cesium dihydrogen arsenate and cesium dideuterium arsenate.

8. An imaging device according to claim 2, wherein said means to generate said pulse laser light beam comprises a laser device containing neodymium as an active material and frequency conversion means to convert the wavelength of the output of said laser device.

9. An imaging device according to claim 2, wherein, when the wavelength of said pulse laser light beam is $\lambda$, the wavelength of said acoustic wave is $\Lambda$ and the incident angle of said light beam to the wave-front of said wave is $\theta$, the relation between said $\lambda$ and $\Lambda$ is so selected as to satisfy the condition of $2 \sin \theta = \lambda/\Lambda$.

10. An imaging device for reproducing a multicolor spatial picture from multicolor video-signals, comprising means with which $n$ acoustic waves propagated through an acousto-optic medium are modulated by $n$ time-sequence video-signals corresponding to an original picture of $n$ kinds of colors, thereby to convert said $n$ time-sequence video-signals into a spatial distribution of an optical property of said medium, and means which irradiates pulse laser light beams of said $n$ kinds of colors on said medium and which emits said light beams in a manner to be synchronized in time with the respective ones of said $n$ video-signals, wherein the emitting time of the respective ones of said light beams is not greater than H/N, where H is the line scanning time defined as a duration of the video-signal in which a scanning line of the spatial picture is involved, and N is the number of the picture elements contained in said scanning line.

11. An imaging device according to claim 10, wherein the length of said acousto-optic medium is nearly equal to the distance which the acoustic waves propagate through said medium during said line scanning time.

12. An imaging device according to claim 10, including a high frequency power source for producing an acoustic wave to be modulated and means which compensates for attenuation of the respective ones of said acoustic waves propagated through said acousto-optic medium in such a manner that the high-frequency power source exciting said acoustic waves is so made that, when viewed in respect of one scanning line, the power output of said source decreases from the leading end towards the trailing end thereof, so as to return to the original output level again at the leading end of the succeeding scanning line.

13. An imaging device according to claim 10, wherein said means to generate said $n$ pulse laser light beams comprise $n$ laser devices containing neodymium as an active material and frequency conversion means to convert the wavelength of the output light of said $n$ laser devices.

14. An imaging device according to claim 13, wherein said frequency conversion means comprises a nonlinear optical crystal selected from the group consisting of lithium iodate, barium sodium niobate, cesium dihydrogen arsenate and cesium dideuterium arsenate.

15. An imaging device according to claim 10, wherein, when the wavelength of said $n$ pulse laser light beams are $\lambda_1$, $\lambda_2$, --- $\lambda_n$, the wavelength of said $n$ acoustic waves are $\Lambda_1$, $\Lambda_2$, ---$\Lambda_n$, and the incident angle of said light beams to the wavefront of said waves is A, the relation between said $\lambda_1$, $\lambda_2$, --- $\lambda_n$ and $\Lambda_1$, $\Lambda_2$, ---$\Lambda_n$ respectively are so selected as to satisfy the conditions of $2 \sin A = \lambda_1/\Lambda_2 = \lambda_2/\Lambda_2 = --- \lambda_n/\Lambda_n$.

16. An imaging device for reproducing a multicolor spatial picture from multicolor video-signals, comprising means in which $n$ acoustic waves propagated through respective $n$ acousto-optic mediums are modulated by the respective ones of $n$ time-sequence video-signals corresponding to a multicolored original picture synthesized by $n$ kinds of colors, thereby to convert said $n$ time-sequence video-signals into a spatial distribution of an optical property of the respective ones of said $n$ mediums, each which irradiates pulse laser light beams of said $n$ kinds of colors on said mediums and which emits said light beams in a manner to be synchronized in time with the respective ones of said $n$ video-signals, wherein the emitting time of the respective ones of said light beams is not greater than H/N, wherein H is a line scanning time and N is the number of the picture elements contained in a scanning line of the spatial picture corresponding to the video-signal of said scanning time.

* * * * *